(12) United States Patent
Christianson et al.

(10) Patent No.: US 7,688,257 B1
(45) Date of Patent: Mar. 30, 2010

(54) MARINE RADAR SYSTEMS AND METHODS

(75) Inventors: Paul Christianson, Seattle, WA (US);
Gloria Logan, Woodinville, WA (US);
Brennan Kilty, Seattle, WA (US)

(73) Assignee: Honeywell International Inc.,
Morristown, NJ (US)

( * ) Notice: Subject to any disclaimer, the term of this patent is extended or adjusted under 35 U.S.C. 154(b) by 0 days.

(21) Appl. No.: 12/410,250

(22) Filed: Mar. 24, 2009

(51) Int. Cl.
*G01S 7/40* (2006.01)
*G01S 13/26* (2006.01)

(52) U.S. Cl. .................. 342/174; 342/41; 342/131; 342/132; 342/134; 342/137; 342/195; 342/201; 342/202; 342/203; 342/204

(58) Field of Classification Search .............. 342/174, 342/26 R, 26 A–26 D, 128–137, 159, 192, 342/195, 200–204
See application file for complete search history.

(56) References Cited

U.S. PATENT DOCUMENTS

| | | | |
|---|---|---|---|
| 4,136,341 A | 1/1979 | Mulder et al. | |
| 4,560,961 A * | 12/1985 | Kestenbaum | 342/201 |
| 4,739,186 A * | 4/1988 | Crookshanks | 307/106 |
| 4,901,082 A | 2/1990 | Schreiber et al. | |
| 5,140,332 A | 8/1992 | Martin et al. | |
| 5,223,838 A | 6/1993 | Tang et al. | |
| 5,264,852 A | 11/1993 | Marquet | |
| 5,361,072 A | 11/1994 | Barrick et al. | |
| 5,428,361 A * | 6/1995 | Hightower et al. | 342/201 |
| 5,552,793 A | 9/1996 | McLeod et al. | |
| 6,067,043 A | 5/2000 | Faure et al. | |
| 6,087,981 A | 7/2000 | Normant et al. | |
| 6,150,976 A | 11/2000 | Cooley | |
| 6,225,943 B1 * | 5/2001 | Curley et al. | 342/137 |
| 6,967,613 B2 * | 11/2005 | Holmberg et al. | 342/25 A |
| 7,019,686 B2 * | 3/2006 | Hester et al. | 342/174 |
| 7,053,814 B2 * | 5/2006 | Yap | 342/54 |
| 7,408,499 B2 * | 8/2008 | Szajnowski | 342/70 |
| 2005/0046609 A1 * | 3/2005 | Wasiewicz | 342/159 |
| 2005/0190100 A1 * | 9/2005 | Hester et al. | 342/174 |
| 2005/0206557 A1 * | 9/2005 | Holmberg et al. | 342/191 |
| 2005/0225481 A1 * | 10/2005 | Bonthron | 342/175 |
| 2006/0244653 A1 * | 11/2006 | Szajnowski | 342/70 |
| 2009/0058717 A1 * | 3/2009 | Kuhn | 342/175 |
| 2009/0109086 A1 * | 4/2009 | Krieger et al. | 342/25 F |

FOREIGN PATENT DOCUMENTS

| | | | |
|---|---|---|---|
| CN | 101241180 A * | 8/2008 | |
| EP | 0389720 | 10/1990 | |
| EP | 1881342 A1 * | 1/2008 | |
| GB | 2085251 A | 4/1982 | |
| JP | 05240949 A * | 9/1993 | |
| WO | WO 2006123084 A1 | 11/2006 | |

* cited by examiner

*Primary Examiner*—John B Sotomayor
(74) *Attorney, Agent, or Firm*—Black Lowe & Graham PLLC

(57) ABSTRACT

Marine radar systems and methods for producing low power, high resolution range profile estimates. Non-linear Frequency Modulation (NLFM) pulse compression pulses are frequency stepped to form a low power, wide-bandwidth waveform. Periodically, calibration filters are determined and applied to return signals for correcting non-ideal effects in the radar transmitter and receiver.

20 Claims, 3 Drawing Sheets

MARINE RADAR SYSTEMS AND METHODS

BACKGROUND OF THE INVENTION

Marine radars are transitioning from high power magnetron transmitters to low power solid-state transmitters as they offer lower maintenance, more consistent performance, and the ability to be more discrete when transmitting. The challenge with low-power transmitters becomes keeping range resolution high while retaining a high signal-to-noise ratio (SNR). Two such methods are pulse compression and stepped frequency, both of which require advanced waveforms and associated methods to transmit and receive them while minimizing the non-ideal effects of the hardware to keep processing artifacts from cluttering the subsequent range profile estimates. A range profile represents the volume of space illuminated by the RF energy directed out of the radar antenna for a given pointing direction. Marine radars that use non-linear FM pulse compression waveforms (or any type of pulse compression waveform) are faced with the challenge of keeping range sidelobes low during the entire operation of the radar. Strong range sidelobes reduce dynamic range, create inaccurate size representations of targets, and clutter the radar display. Flat amplitude and linear phase across the waveform bandwidth is required to achieve minimum range sidelobes. Any phase or amplitude errors in the radar system will increase range sidelobes. These errors can stem from several effects:

- Radar components that change as temperature and pressure change;
- Non-linearities in the transmitter rise-time that are likely to vary for different waveforms;
- Errors in the transmit and/or receive channels that are likely to vary for different waveforms;
- Calibrating a system for one portion of the system bandwidth then using a different portion of the bandwidth; and
- Calibrating a system for the average errors over the system bandwidth then using a portion of the bandwidth that differs from the average.

Therefore, there exists a need for an improved marine radar system which lowers transmission power and offers consistent performance with a low maintenance requirement while maintaining or improving detection sensitivity, range resolution, and accuracy of the display.

SUMMARY OF THE INVENTION

Marine radar systems and methods for producing high resolution and sufficiently sensitive range profile estimates using low transmission power, self-calibration, pulse compression, and stepped frequency are disclosed. Non-linear Frequency Modulation (NLFM) pulse compression pulses are frequency stepped to form a low power waveform with high effective bandwidth. Calibration filters, periodically updated by a self-calibration function of the radar, are applied to range profile estimates to correct for non-ideal distortions in the detected radar returns from errors or variations in the transmit and receive paths of the radar and to correct range errors by properly adjusting the range-time delay of the range profile.

The present invention provides improved sensitivity on a pulse-by-pulse basis using NLFM pulse compression. The pulse-to-pulse stepped frequency processing of pulse compressed sub-pulses—with stepped center frequencies—provides higher effective system bandwidth which translates to improved range resolution. This combination allows for a transmitter and receiver with low transmission power and limited bandwidth to maintain a high SNR and achieve much higher effective bandwidth than the hardware is able to instantaneously support. The required sensitivity varies on the environment the radar will be operating in and the radar cross-section of targets to be detected. The required effective bandwidth of the system is inversely proportional to the desired range resolution of the radar, and the minimum instantaneous system bandwidth depends on the number of stepped frequency sub-pulses that can be accommodated by the processing system in its real-time schedule, the antenna beam-width, and the rate-of-scan. A Self-calibration process is periodically performed to reduce amplitude and phase deformations and to regulate the range-time delay which otherwise result in unwanted artifacts in the range profile estimates and therefore a cluttered radar display.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
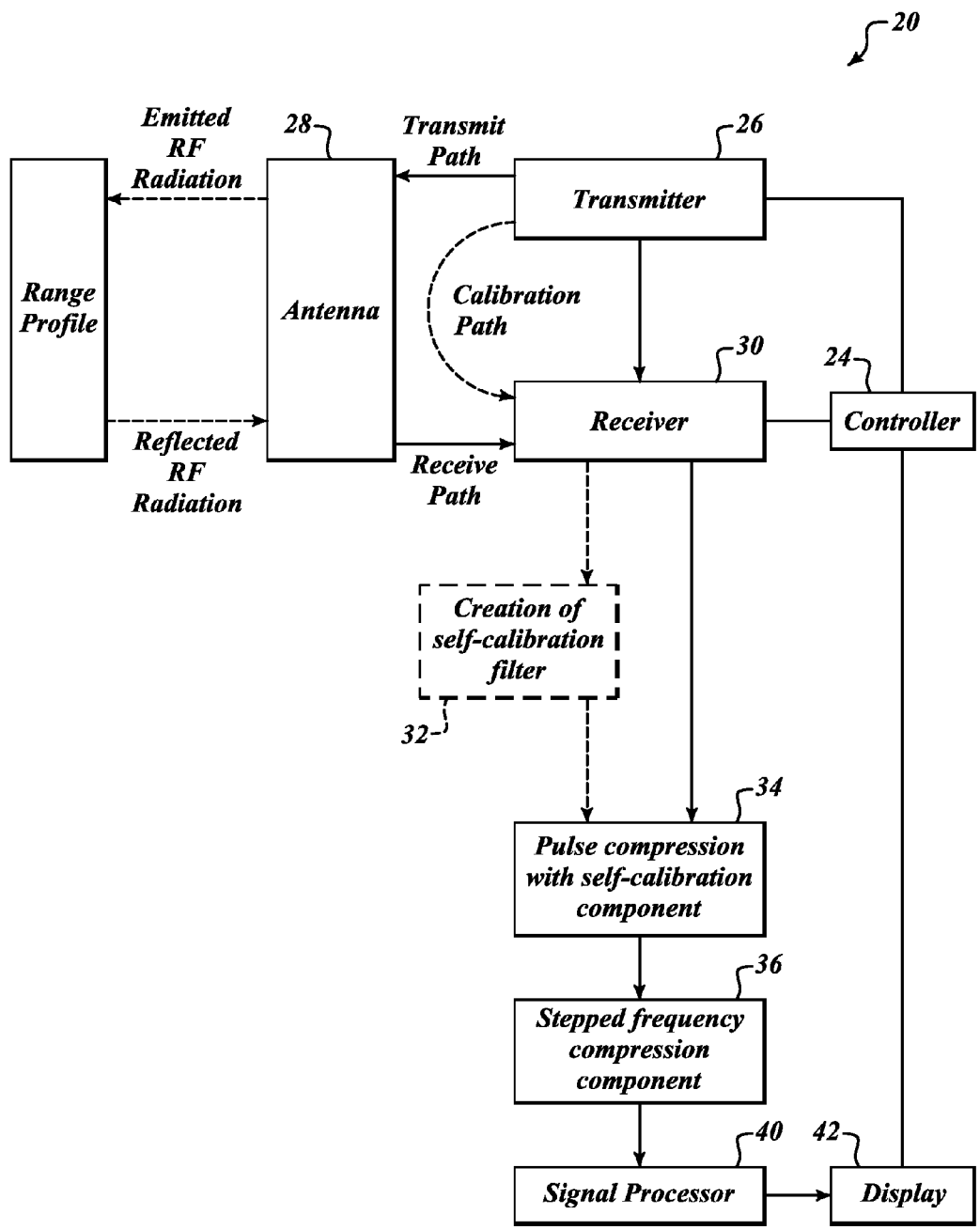
FIG. 1 is a block diagram of an exemplary embodiment of the NLFM stepped frequency waveform calibration system.

FIG. 1 is a block diagram of an exemplary embodiment of a marine radar system 20. The system 20 includes a controller 24, a transmitter 26, an antenna 28, a receiver 30, signal calibration and compression components (32, 34, 36), a signal processor 40, and a display device 42.

The transmitter 26 generates and emits a radar waveform signal as directed by controller settings. The antenna 28 directs the signal generated by the transmitter 26. The antenna 28 is swept such that the system is able to detect objects in an area of interest about the installation. A radar return is reflected energy from an object upon which the emitted radar pulse is incident on. The received radar returns are communicated to the receiver 30.

The marine radar transmitter 26 generates a non-linear frequency modulation (NLFM) stepped frequency sub-pulse and transmits it via the antenna 28. Reflections are detected by the receiver 30, calibrated and pulse compressed in the module 34, and stored in a temporary array. This cycle is repeated for each sub-pulse in the NLFM stepped frequency waveform. Each cycle produces a pulse compressed range profile estimate with frequency content centered at the frequency corresponding to the given transmitted sub-pulse center frequency. After all the sub-pulses have been transmitted, received, calibrated, and pulse-compressed, the narrowband frequency content of the individual sub-pulses are combined by the stepped frequency module 36 into a wideband estimate of the range profile. The signal processor 40 then performs any additional processing and communicates the new range profile estimate to the display 42.

During self-calibration, the marine radar transmitter 26 regenerates the same series of NLFM stepped frequency sub-pulses. Each sub-pulse bypasses the antenna and is sent directly to the receiver 30 via a "calibration path" built into the hardware. The received pulse data for each individual sub-pulse is used to create a calibration filter in the module 32 which is subsequently applied to reflections received, after transmit of a corresponding sub-pulse, during normal operation either before or after pulse compression. The calibration filter is based on a previously determined ideal signal (stored in memory), the pulse data received via the calibration path and an estimation of noise. In addition to amplitude and phase corrections, the self-calibration also adjusts the signal range-time delay to ensure proper range calibration which is especially critical for the stepped frequency processing.

Self-calibration is performed at very frequent intervals throughout the entire radar operation time. As such, the calibration filter is created from actual pulses currently generated by the marine radar system allowing for continuous correction of current phase and amplitude errors, even errors that change over time. The self-calibration is constantly adapting to any changes in the system 20. In addition, the self-calibration is performed independently for each NLFM stepped frequency waveform that the system 20 employs, so it corrects phase and amplitude errors that could vary for different waveforms. An example calibration method is described in U.S. Pat. No. 7,019,686, which is hereby incorporated by reference.

Figure 2:
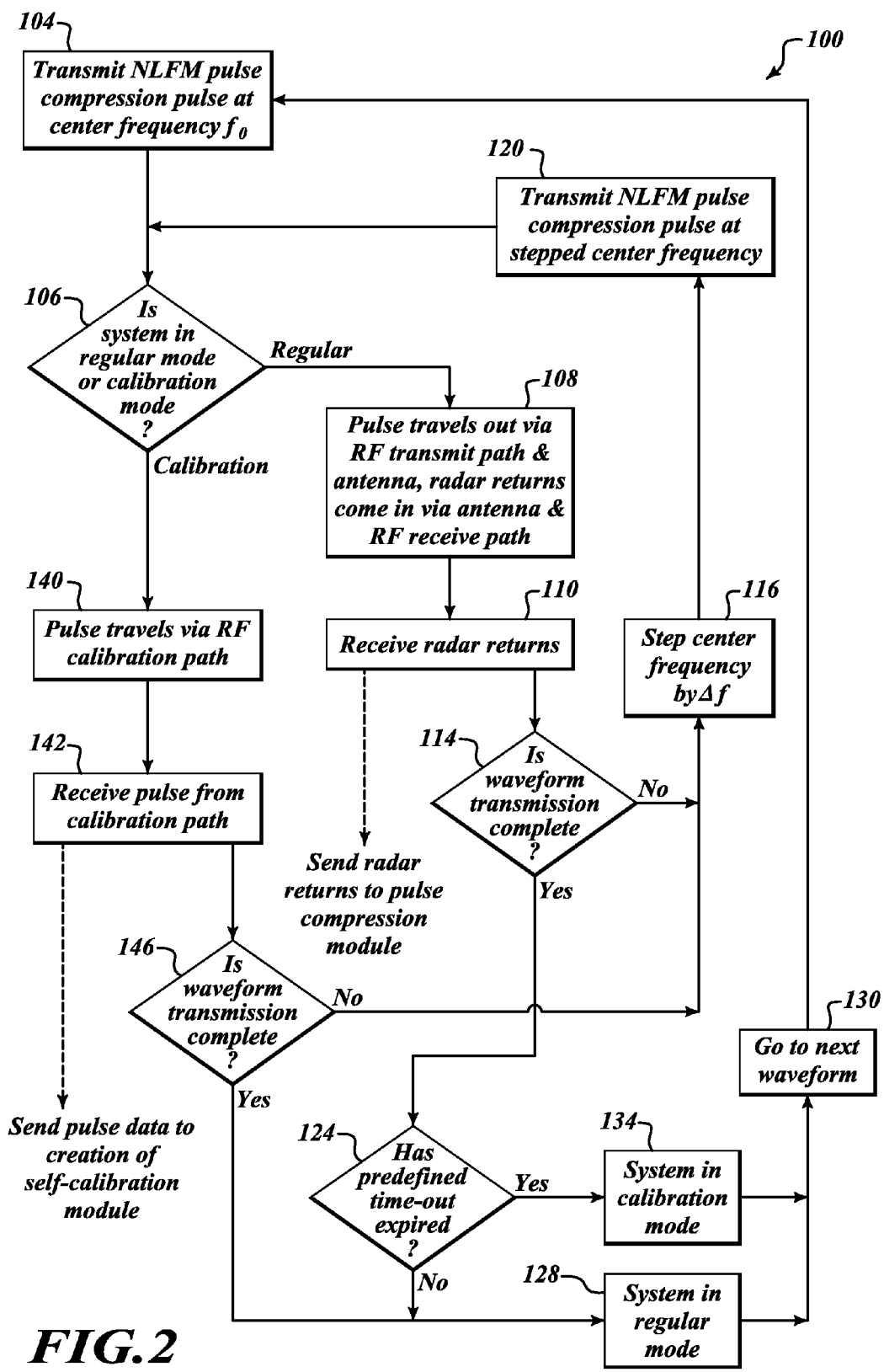
FIG. 2 conceptually illustrates a process used by the system of FIG. 1.

FIG. 2 conceptually illustrates an exemplary process 100 performed by the system 20. First, at a block 104, NLFM pulse compression pulse is transmitted at center frequency $f_o$. Then, at a decision block 106, the process 100 determines what mode the system 20 is in (Regular Mode; Calibration Mode). If the system 20 is in the Regular Mode, then, at a block 108 a pulse is emitted from the transmitter 26 through the antenna 28 and radar returns are received by the antenna 28. Next, at a block 110, the receiver 30 receives the radar returns from the antenna 28 and sends radar returns to the pulse compression module 34 to be compressed and calibrated before being passed on for further processing. The process 100 then determines if waveform transmission is complete, at a decision block 114. If waveform transmission is not complete, the center frequency is stepped by $\Delta f$ and the NLFM pulse compression pulse is transmitted at the stepped center frequency, blocks 116 and 120. If waveform transmission is determined to be complete, the process 100 determines if a predefined time-out has expired, decision block 124. If the predefined time-out has not expired, the system 20 remains in the Regular Mode, block 128. If the predefined time-out has expired, the system 20 is placed in the Calibration Mode, block 134. After blocks 128 or 134, the process 100 goes go to next waveform (block 130) and returns to the block 104.

If at decision block 106, the system 20 is in the Calibration Mode, then, at a block 140 a NLFM pulse compression pulse is transmitted from the transmitter 26 to the receiver 30 via an RF calibration path, bypassing the antenna 28, blocks 140 and 142. The received NLFM pulse compression pulse is sent to the calibration filter module 32 and used to create a self-calibration filter which is passed on to the pulse compression module 34. After the block 142, at a decision block 146, the process 100 determines if the waveform is complete. If the waveform is not complete, the process 100 goes to the block 116. If the waveform is complete, the system 20 is placed in the Regular Mode, block 128. The process 100 then goes go to next waveform (block 130) and returns to the block 104.

Figure 3:
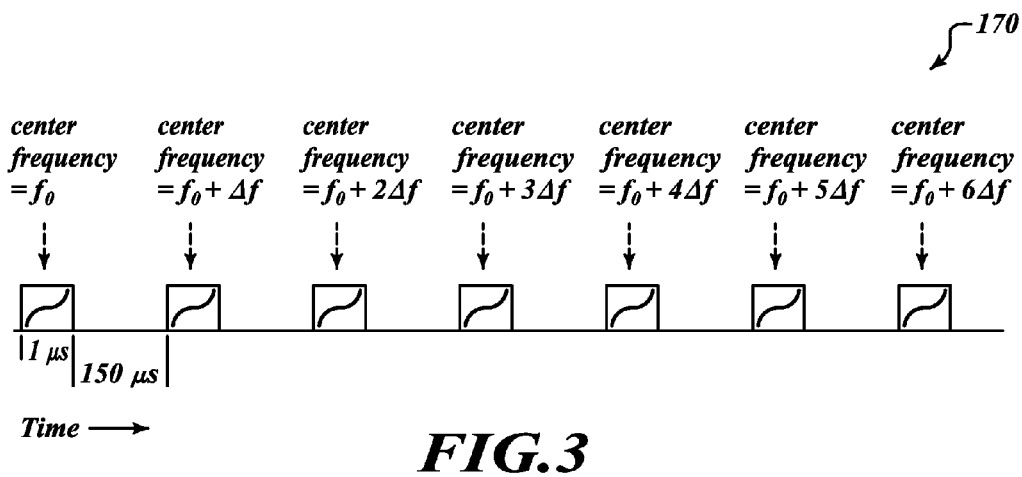
FIG. 3 is a conceptual plot of a NLFM stepped frequency waveform transmitted from the radar system.

FIG. 3 illustrates a NLFM stepped frequency waveform 170 generated by the transmitter 26. In this example, the waveform 170 includes seven sub-pulses. Other number of pulses may be used. In an exemplary embodiment, the pulse duration is 1 micro ($\mu$) second and the separation between the pulses (receive interval) is 150 $\mu$s. Other pulse durations and separation sizes may be used. In this embodiment, the frequency step $\Delta f$ is 2.25 megahertz, and calibration is performed one time for each unique pulse every 10 seconds. Other frequency steps and time periods between calibrations may be used.

Each of the pulses has modulated frequency content. The frequency modulation may be characterized, in this exemplary embodiment, as having a frequency that increases non-linearly during the duration of the pulse. The series of frequency modulated pulses may be further characterized as each having an increased center frequency wherein the center frequency of each adjacent pulse increases by $\Delta f$. Thus, the first pulse has an initial predefined center frequency of $f_o$. The second pulse has a predefined center frequency of $(f_o + \Delta f)$, and so on. In other embodiments, the frequency of the individual pulses may be modulated in any suitable manner. Non-limiting examples of pulse compression modulation include linear pulse chirps, non-linear pulse chirps, barker codes, or the like. It is also appreciated that in other embodiments the frequency spacing may not be uniform, and the order in which the sub-pulses' center frequencies are stepped need not be increasing or decreasing monotonically within a given waveform or the same from one waveform to another waveform. Generally, the number of sub-pulses in an output NLFM stepped frequency waveform may be defined by a variable "m" (see Equation 1 below).

Figure 4:
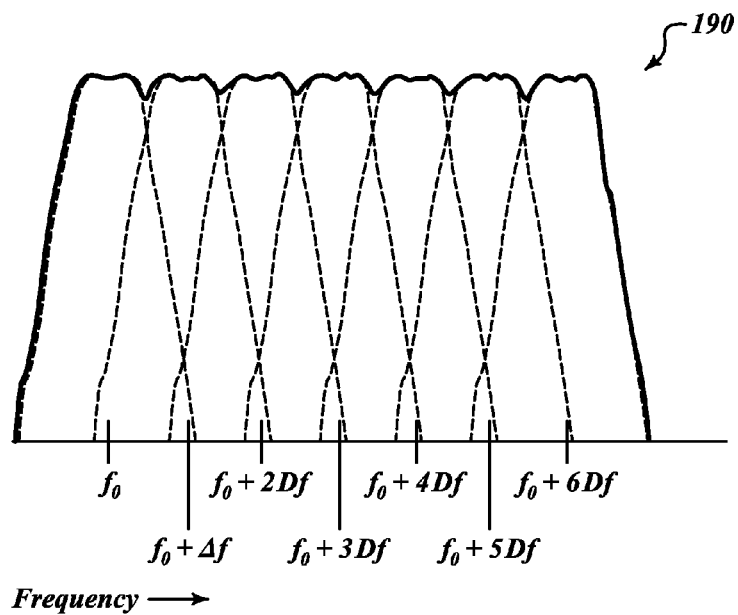
FIG. 4 is a conceptual frequency domain plot of narrowband spectra of the individual waveform sub-pulses and the combined wideband spectra of the estimated range profile.

FIG. 4 is a frequency domain plot 190 of an estimated range profile resulting from an emitted NLFM stepped frequency waveform of FIG. 3. The dashed lines show the seven individual narrow band range profile spectrum estimates resulting from the seven individual waveform sub-pulses. The solid line shows the final resulting wideband spectrum after the seven spectra are combined.

The ideal signal used to create the calibration filter is the designed sub-pulse (which can be modeled and represented numerically) that is processed through models of the RF front-end (26, 30) from transmit up to but not including the pulse compression stage, such as transmitter rise and fall times, transmitter droop, analog filters, A/D quantization, digital filters, and decimation. The ideal signal is the baseline reference for an ideal system. The ideal signal may differ for each of the transmitted sub-pulses (FIG. 3). In a perfect radar, each actual sub-pulse, transmitted and front-end processed by the system 20, would exactly match its corresponding ideal signal going into the pulse compression stage. Real-world components, however, introduce phase and amplitude errors during transmit and receive which distort the signal such that it no longer matches its ideal signal. These distortions result in non-ideal pulse compression of the received radar data.

Calibration of Received Data:

The "pulse compression with self-calibration" component 34 calibrates the received radar reflections by (1) transforming the received data into the frequency domain, and (2) multiplying together the frequency-domain received data, the frequency-domain pulse compression filter and the frequency-domain calibration filter. The order in which the filters are applied is not important as they are linear and time-invariant. The pulse compression filter is a previously determined matched filter for the sub-pulse (stored in memory). The calibration filter is determined as shown in Equation 1 below. More detailed information about the calibration filter can be found in U.S. Pat. No. 7,019,686.

$$\text{Cal Filter}_i = [(IP \cdot CP^*) + N] / [(CP \cdot CP^*) + N] \tag{1}$$

where

Cal Filter=resulting frequency domain calibration filter coefficients;

IP=ideal signal (in the frequency domain);

CP=pulse data sent via the calibration path (in the frequency domain); CP*=complex conjugate of CP; and N=noise power estimate of the calibration path; and i=sub-pulse index number between 1 and total number of sub-pulses m.

In one embodiment, prior determined calibration coefficients (filters) are replaced or combined with newly determined calibration coefficients after each Calibration Mode. Any suitable manner of combining calibration coefficients may be used. For example, a weighting factor could be assigned to either the newly determined calibration coefficients or the prior determined calibration coefficients. Alternatively, or additionally, the weighting factors could vary as a function of time. For example, older prior determined calibration coefficients may be given less weighting than relatively more recently determined calibration coefficients.

Some embodiments will emit different types of pulse compressed stepped frequency waveforms at different times. For example, the number of compressed pulses m may vary. Alternatively, or additionally, the duration of the pulses may vary. Alternatively, or additionally, the nature of the pulse compression may vary. For example, but not limited to, the pulse compression may be changed from non-linear pulse compression to linear pulse compression.

In some embodiments that emit different types of pulse compressed stepped frequency waveforms at different times, a plurality of calibration filters (Cal Filter$_m$) may be determined for each of the different types of pulse compressed stepped frequency waveforms. The plurality of calibration filters (Cal Filter$_m$) can be saved into a calibration coefficients database for later use such that the particular type of emitted pulse compressed stepped frequency waveform is self-calibrated.

In an alternative embodiment, the calibration coefficients determined for the m calibration filters (Cal Filter$_m$) may be substantially the same. If so, the calibration coefficients may be combined into a single calibration filter by averaging, or by using some other suitable combining process. Or, one of the calibration coefficients can be selected for use by a single calibration filter (Cal Filter).

In one embodiment, the transmitter nominally emits 40 watts of peak power, but this method is not limited to a particular power range.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    a) transmitting a first waveform from an antenna as received from a transmitter, the waveform comprising a plurality of non-linear frequency modulation (NLFM) pulse compression sub-pulses, each sub-pulse being separated in time by a receive interval and in frequency by Δf;
    b) receiving at a receiver any returns associated with the transmitted sub-pulses;
    c) if transmission of the first waveform is complete and a predefined time-out
    has expired, performing calibration comprising:
        transmitting a second waveform directly from the transmitter to the receiver, the second waveform being essentially identical to the first waveform when outputted by the transmitter; and
        generating one or more calibration filters based on the transmitted second waveform and one or more previously defined ideal pulses;
    d) if transmission of the second waveform is complete, returning to a) for a next waveform;
    e) generating a wideband range profile from the received returns associated with the transmitted sub-pulses based on the one or more calibration filters and a previously defined pulse compression filter;
    f) processing the wideband range profile for output; and
    g) outputting the processed wideband range profile.

2. The method of claim 1, wherein e) comprises:
    1) transforming a return associated with a transmitted sub-pulse to the frequency domain; and
    2) multiplying the transformed return by the pulse compression filter and the one or more calibration filters; and
    repeating 1 and 2 for all the sub-pulses in a waveform.

3. The method of claim 2, wherein e) further comprises combining the multiplied results for all the sub-pulses in a waveform based on stepped frequency methods, thereby generating the wideband range profile.

4. The method of claim 1, wherein each of the pulse compression sub-pulses in the stepped frequency pulse compression waveform are transmitted, received, and stored as a temporary array before the next pulse is transmitted and each of the stored temporary arrays is separately calibrated and pulse compressed individually with the appropriate filters.

5. The method of claim 1, further comprising:
    replacing one or more of the previously determined calibration filters with corresponding one or more most recently determined calibration filters.

6. The method of claim 1, further comprising:
    combining one or more of the previously determined calibration filters with corresponding most recently determined calibration filters.

7. The method of claim 1, wherein outputting comprises generating a radar image based on the processed returns and displaying the radar image on a display device.

8. A marine radar system comprising:
    a transmitter configured to generate a first waveform comprising a plurality of non-linear frequency modulation (NLFM) pulse compression sub-pulses, each sub-pulse being separated in time by a receive interval and in frequency by Δf;
    an antenna configured to transmit the generated first waveform as received from the transmitter;
    a receiver configured to receive any returns associated with the transmitted sub-pulses;
    a first component configured to generate a wideband range profile from the received returns associated with the transmitted sub-pulses;
    a signal processor configured to process the wideband range profile for output;
    an output device for outputting the processed wideband range profile,
    wherein the transmitter transmits a second waveform directly to the receiver, if transmission of the first waveform is complete and a predefined time-out has expired, the second waveform being essentially identical to the first waveform when outputted by the transmitter; and
    a second component configured to generate one or more calibration filters based on the transmitted second waveform and one or more previously defined ideal sub-pulses, wherein when transmission of the second waveform is complete, the transmitter transmits a next waveform to the antenna, wherein the first component generates the wideband range profile based on the one or more calibration filters and a previously defined pulse compression filter.

9. The system of claim 8, wherein the first component comprises:
a pulse compression module configured to transform a sub-pulse return to the frequency domain, multiply the transformed return by the pulse compression filter and the one or more calibration filters and repeat until all the sub-pulses in a waveform have been transformed and multiplied.

10. The system of claim 9, wherein the first component comprises:
a stepped frequency module configured to combine the multiplied results for all the sub-pulses in a waveform based on stepped frequency methods, thereby generating the wideband range profile.

11. The system of claim 8, wherein the second component replaces one or more of the previously determined calibration filters with corresponding most recently determined calibration filters.

12. The system of claim 8, wherein the second component combines one or more of the previously determined calibration filters with corresponding most recently determined calibration filters.

13. The system of claim 8, wherein the output device comprises a display device.

14. A marine radar system comprising:
a means for transmitting a first waveform from an antenna as received from a transmitter, the waveform comprising a plurality of non-linear frequency modulation (NLFM) pulse compression sub-pulses, each sub-pulse being separated in time by a receive interval and in frequency by $\Delta f$,
a means for receiving at a receiver any returns associated with the transmitted sub-pulses;
a means for sending the received returns to a pulse compression module;
if transmission of the first waveform is complete and a predefined time-out has expired, a means for performing calibration comprising:
a means for transmitting a second waveform directly from the transmitter to the receiver, the second waveform being essentially identical to the first waveform when outputted by the transmitter; and
a means for generating one or more calibration filters based on the transmitted second waveform and one or more previously defined ideal pulses;
a means for generating a wideband range profile based on the one or more calibration filters and a previously defined pulse compression filter;
a means for processing the wideband range profile for output; and
a means for outputting the processed wideband range profile,
wherein if transmission of the second waveform is complete, the means for transmitting proceeds to a next waveform.

15. The system of claim 14, wherein the means for generating comprises:
a means for transforming a return associated with a transmitted sub-pulse to the frequency domain; and
a means for multiplying the transformed return by the pulse compression filter and the one or more calibration filters,
wherein the means for transforming and multiplying repeat for all the sub-pulses in a waveform.

16. The system of claim 15, wherein the means for generating further comprises a means for combining the multiplied results for all the sub-pulses in a waveform based on stepped frequency methods, thereby generating the wideband range profile.

17. The system of claim 14, wherein each of the pulse compression sub-pulses in the stepped frequency pulse compression waveform are transmitted, received, and stored as a temporary array before the next sub-pulse is transmitted and each of the stored temporary arrays is separately calibrated and pulse compressed individually with the appropriate filters.

18. The system of claim 14, further comprising:
a means for replacing one or more of the previously determined calibration filters with corresponding one or more most recently determined calibration filters.

19. The system of claim 14, further comprising:
a means for combining one or more of the previously determined calibration filters with corresponding most recently determined calibration filters.

20. The system of claim 14, wherein the means for outputting comprises generating a radar image based on the processed returns and displaying the radar image on a display device.

* * * * *